(12) United States Patent
Postle

(10) Patent No.: US 11,910,892 B2
(45) Date of Patent: Feb. 27, 2024

(54) MOBILE ELECTRONIC DEVICE PROTECTIVE CASE WITH IMPROVED SOUND MANAGEMENT

(71) Applicant: Christopher Postle, Aurora, CO (US)

(72) Inventor: Christopher Postle, Aurora, CO (US)

( * ) Notice: Subject to any disclaimer, the term of this patent is extended or adjusted under 35 U.S.C. 154(b) by 0 days.

(21) Appl. No.: 17/813,066

(22) Filed: Jul. 18, 2022

(65) Prior Publication Data

US 2024/0016273 A1 Jan. 18, 2024

(51) Int. Cl.
*A45C 11/00* (2006.01)
*H04B 1/3888* (2015.01)

(52) U.S. Cl.
CPC ............ *A45C 11/00* (2013.01); *H04B 1/3888* (2013.01); *A45C 2011/001* (2013.01); *A45C 2011/002* (2013.01)

(58) Field of Classification Search
CPC .............. A45C 11/00; A45C 2011/001; A45C 2011/002; H04B 1/3888; G10K 11/00; H04R 1/025; H04R 5/02
See application file for complete search history.

(56) References Cited

U.S. PATENT DOCUMENTS

| | | | |
|---|---|---|---|
| 8,342,325 B2 | 1/2013 | Rayner | |
| 8,929,068 B2 | 1/2015 | Richardson | |
| 9,007,758 B2 | 4/2015 | Wilson et al. | |
| 9,066,181 B2 | 6/2015 | Kroupa | |
| 9,197,726 B2 | 11/2015 | Stanimirovic et al. | |
| 9,425,847 B2* | 8/2016 | Norair | H04W 4/12 |
| 9,469,469 B2 | 10/2016 | Rayner | |
| 9,485,557 B2 | 11/2016 | Wilcox et al. | |
| 9,661,413 B2 | 5/2017 | Quinn et al. | |
| 9,961,175 B2* | 5/2018 | Fields | H04M 1/035 |
| 10,264,337 B2 | 4/2019 | Brogan | |
| 10,615,837 B1* | 4/2020 | Amato | H04B 1/036 |
| 2013/0070948 A1 | 3/2013 | Lee et al. | |
| 2014/0174846 A1 | 6/2014 | Molinaro | |
| 2016/0269065 A1 | 9/2016 | Song | |
| 2017/0085687 A1* | 3/2017 | Fernandes | H04M 1/0277 |
| 2018/0103134 A1* | 4/2018 | Malallah | G06F 1/1626 |
| 2019/0029383 A1* | 1/2019 | Lopez | A45C 11/00 |
| 2019/0380461 A1* | 12/2019 | Fathollahi | A45C 11/00 |
| 2020/0304162 A1* | 9/2020 | Ren | B29C 45/14311 |
| 2021/0136190 A1* | 5/2021 | Bohn | H04M 1/035 |
| 2022/0189285 A1* | 6/2022 | Kutscher | G08B 25/016 |
| 2022/0209809 A1* | 6/2022 | Wright | H04M 1/035 |

FOREIGN PATENT DOCUMENTS

WO 2019130257 A1 7/2019

* cited by examiner

*Primary Examiner* — Rafael A Ortiz
(74) *Attorney, Agent, or Firm* — Renner, Otto, Boisselle & Sklar, LLP

(57) ABSTRACT

A protective case for a mobile electronic device includes a sound port including a sound guiding surface that slopes as the sound guiding surface extends away from the left case side and the right case side such that a rear portion of the sound guiding surface adjacent the plane is closer to the left case side and the right case side than a front portion of the sound guiding surface disposed away from the plane.

15 Claims, 7 Drawing Sheets

MOBILE ELECTRONIC DEVICE PROTECTIVE CASE WITH IMPROVED SOUND MANAGEMENT

FIELD OF THE INVENTION

The present disclosure relates generally to mobile electronic devices such as mobile telephones. More particularly, the present disclosure relates to protective cases for mobile electronic devices.

BACKGROUND

Mobile electronic devices are ever-increasing in popularity. While these devices continue to evolve with an ever-increasing list of features and capabilities, they still suffer from at least two long-standing problems: their vulnerability to the elements and poor audio/sound management.

Regarding vulnerability to the elements, these devices are susceptible to damage from general wear and tear, most noticeably the scratching and fracture of the devices' bodies and screens. The devices are also vulnerable to damage from moisture and dust. Protective cases have therefore been developed to protect them from these elements.

Regarding audio/sound management, to maximize screen size, many of these devices have their microphones or speakers located at ends of the device (top or bottom ends) instead of on the main surface of the device that would be closer to a user talking on the phone. This location of the microphones or speakers is suboptimal because it causes the microphones to be offline with sound waves produced by the user or sound waves produced by the speakers to be offline with ears of the user.

SUMMARY OF THE INVENTION

This disclosure provides a protective case for a mobile electronic device that includes a sound port including a sound guiding surface that slopes as the sound guiding surface extends away from the left case side and the right case side such that a rear portion of the sound guiding surface adjacent the plane is closer to the left case side and the right case side than a front portion of the sound guiding surface disposed away from the plane. The sound port directs sound from the user to the microphone or from a speaker to the user, thereby improving sound management and, hence, audio quality.

These and further features of the present invention will be described with reference to the attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
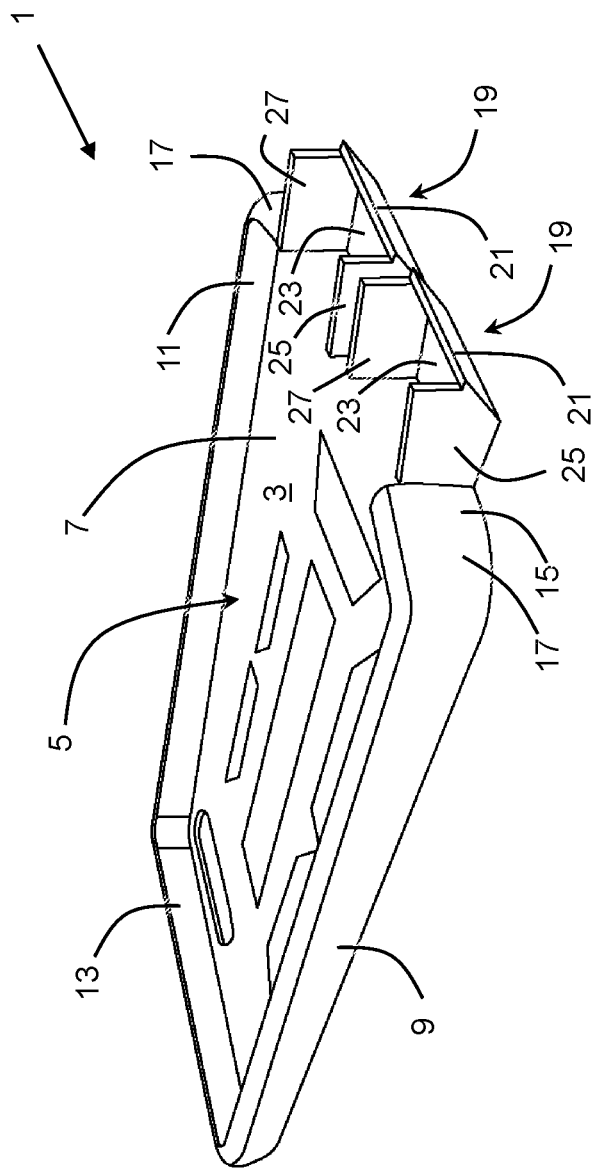
FIG. 1 illustrates a perspective view of an exemplary protective case for a mobile electronic device.
Figure 2:
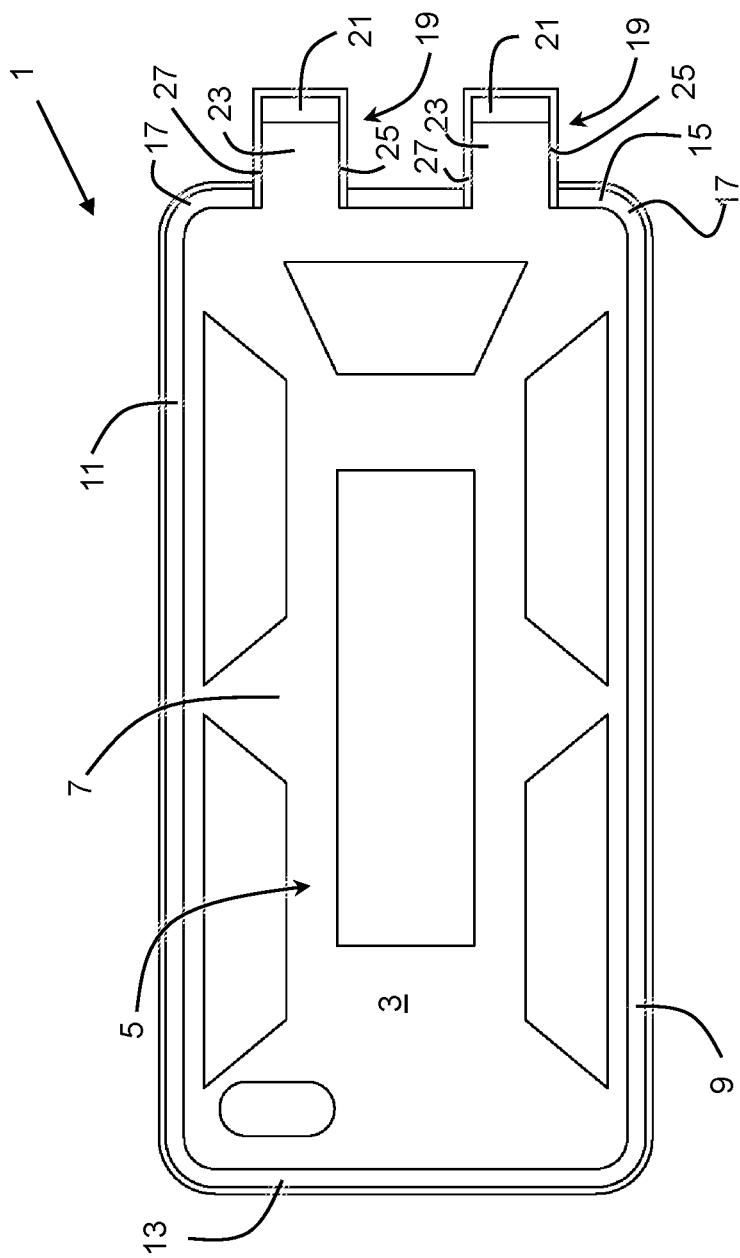
FIG. 2 illustrates a front view of the exemplary protective case for a mobile electronic device.
Figure 3:
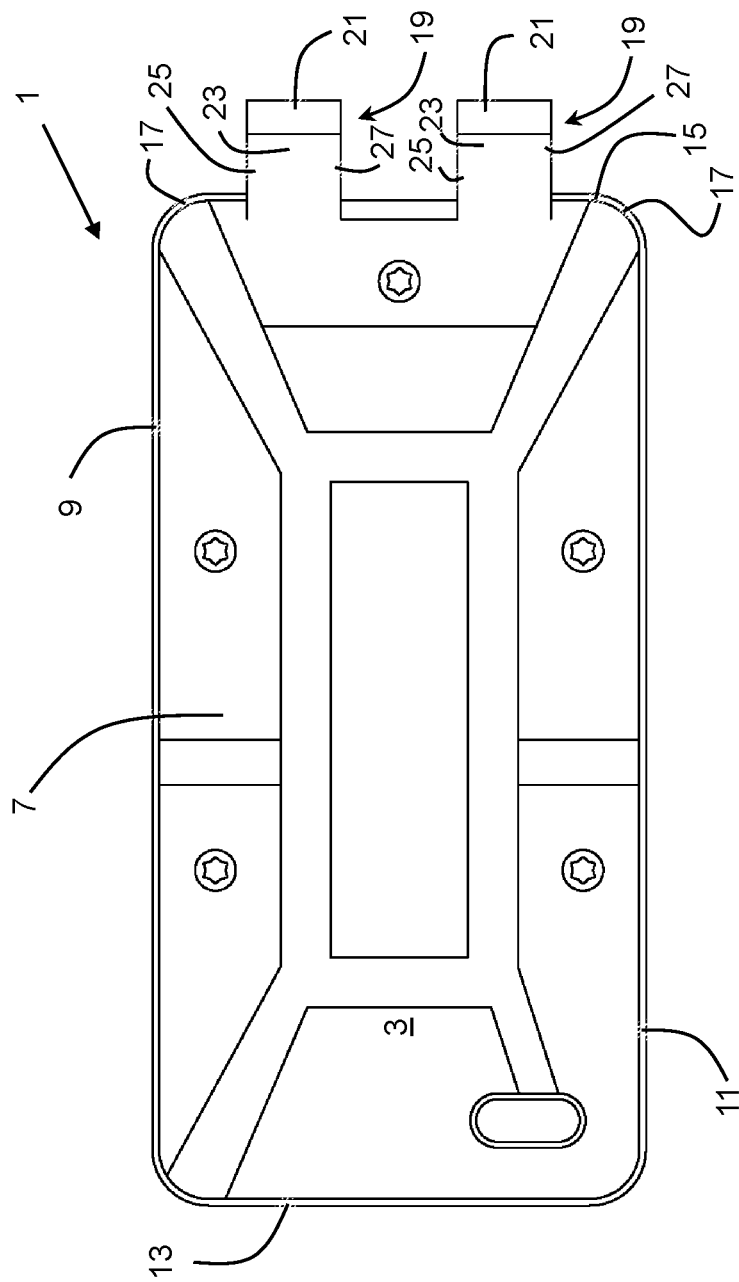
FIG. 3 illustrates a rear view of the exemplary protective case for a mobile electronic device.
Figure 4:
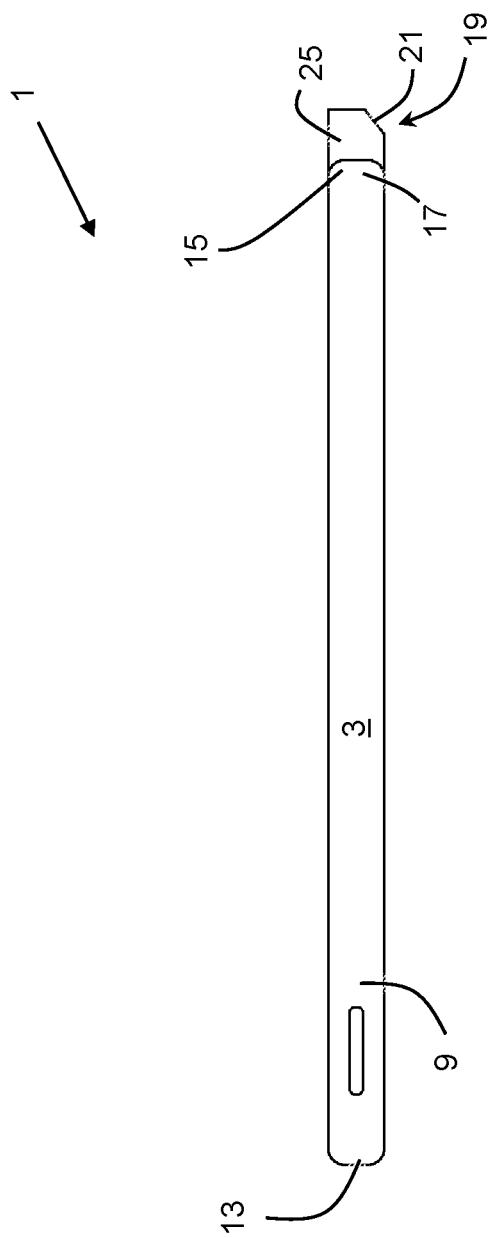
FIG. 4 illustrates a first side view of the exemplary protective case for a mobile electronic device.
Figure 5:
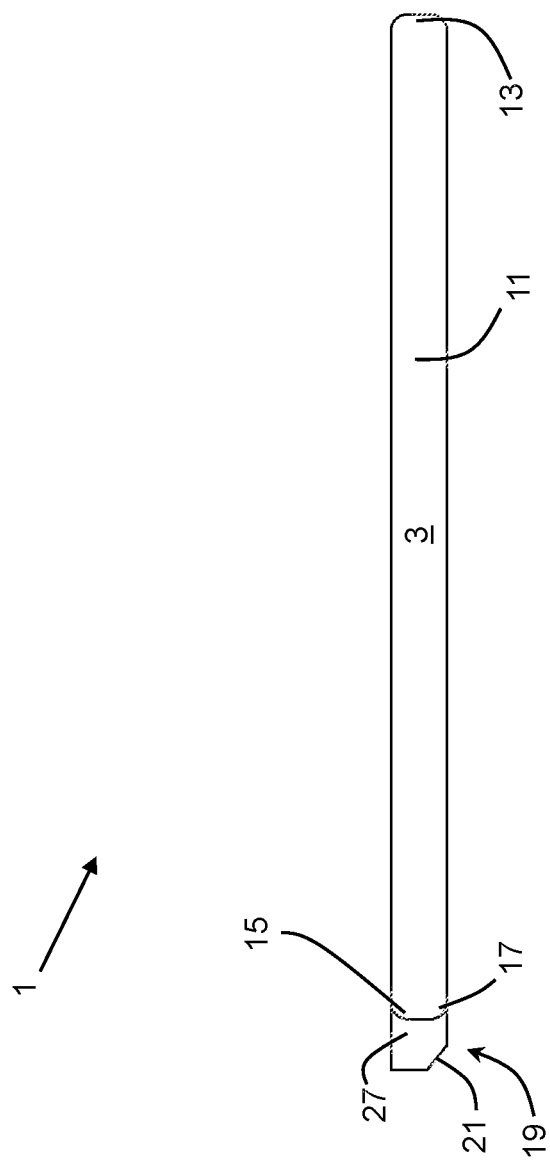
FIG. 5 illustrates a second side view of the exemplary protective case for a mobile electronic device.
Figure 6:
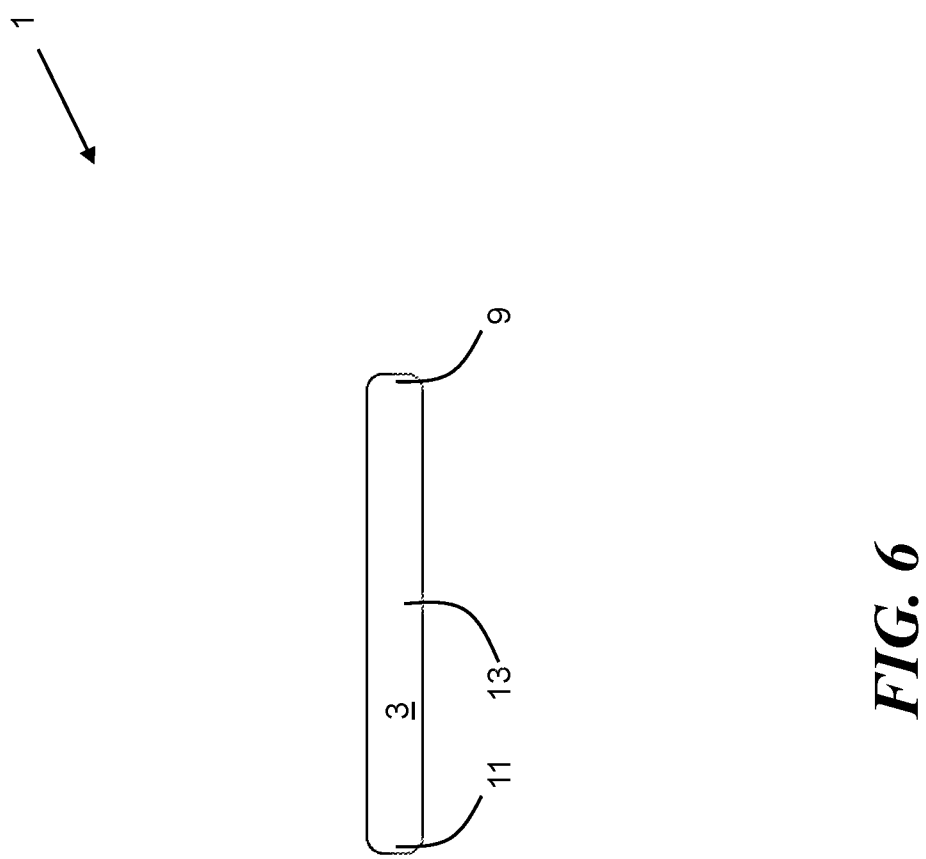
FIG. 6 illustrates a top view of the exemplary protective case for a mobile electronic device.
Figure 7:
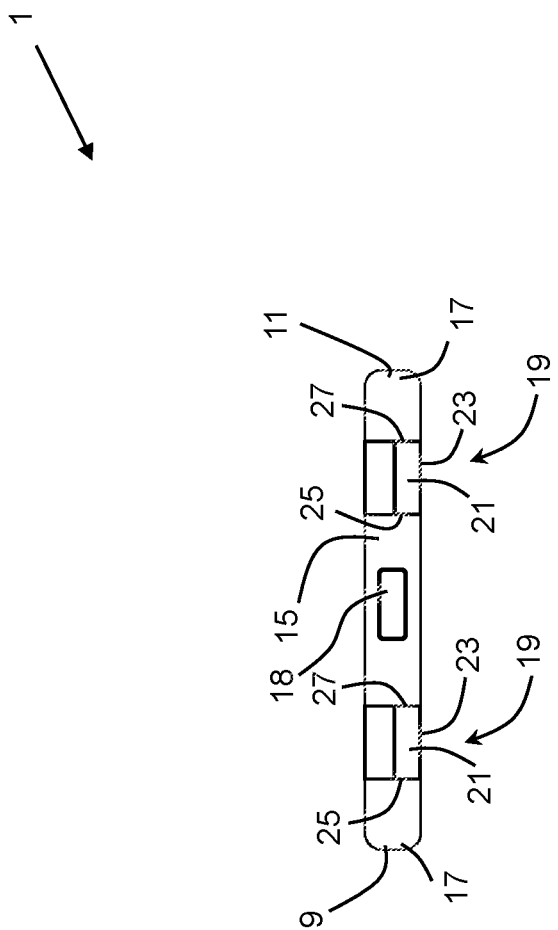
FIG. 7 illustrates a bottom view of the exemplary protective case for a mobile electronic device.

FIGS. 1-7 illustrate an exemplary protective case 1 for a mobile electronic device. The case 1 includes a shell 3 that defines a cavity 5 for receiving the mobile electronic device or at least a portion of the mobile electronic device. In one embodiment, the shell 3 is substantially a unitary structure. In other embodiments, the shell 3 may be comprised of multiple portions (e.g., front and back portions) that assemble together to form the shell 3.

The shell 3 may include a rear panel 7 disposed generally on a plane. The shell 3 may also include a left case side 9 extending from the rear panel 3 substantially perpendicular to and away from the plane. The shell 3 may also include a right case side 11 opposite the left case side 9 and extending from the rear panel 3 substantially perpendicular to and away from the plane. The shell 3 may also include a case top side 13 adjacent top portions of the left case side 9 and the right case side 11 and extending from the rear panel 3 away from and substantially perpendicular to the plane. The shell 3 may also include a case bottom side 15 disposed opposite the case top side 13 adjacent bottom portions of the left case side 9 and the right case side 11.

The case bottom side 15 may include one or more device corner portions 17 adjacent the bottom portion of the left case side 9 or the bottom portion of the right case side 11. The corner portions 17 may be shaped so as to retain the electronic device within the cavity 5 and, thus, the corner portions 17 may also be referred to as device retaining portions 17. The case bottom side 15 may include a data port 18 configured to let through a data or power connector to the electronic device. The shell 3 may include other ports or orifices as needed by the electronic device to work properly.

The case bottom side 15 may also include one or more sound ports 19 each including a sound guiding surface 21 that inclines relative to the plane as the sound guiding surface extends away from the plane and the at least one device retaining portion 17. The sound ports 19 direct sound from the user to a microphone disposed at the bottom side of the electronic device or from a speaker disposed at the bottom side of the electronic device to the user. This tends to improve sound management and, hence, audio quality.

In the illustrated embodiment, the sound guiding surface 21 is an inclined ramp. In other embodiments, the sound guiding surface 21 may be curve and slope as the sound guiding surface 21 extends away from the left and right corner portions 17 such that a rear portion of the sound guiding surface 21 adjacent the plane is closer to the left and right corner portions 17 than a front portion of the sound guiding surface disposed away from the plane. In the illustrated embodiments, two sound ports 19 are shown. In other embodiments, the case 1 may include one or three or more sounds ports 19. In the illustrated embodiment, the sound ports 19 are shown at the bottom side 15. In other embodiments, one or more sound ports 19 may be disposed at the top side 13 or the left or right sides 9 and 11.

The sound guiding surface 21 may incline from 5 to 85 degrees relative to the plane. In the illustrated embodiment, the sound guiding surfaces 21 incline 45 degrees relative to the plane. In the illustrated embodiment, both sound guiding surfaces 21 incline at the same rate. In other embodiments, a first guiding surface 21 and a second guiding surface 21 may incline at different rates or angles relative to the plane from each other.

In the illustrated embodiment, the sound guiding surface 21 is located remote from the cavity 5. In this embodiment, the sound port 19 each includes a port rear portion 23 extending on the plane or parallel to the plane away from the corner portion 17, a left port side 25 extending substantially perpendicular to the port rear portion 23 and a right port side 27 extending substantially perpendicular to the port rear portion 23 opposite the left port side 25. The sound guiding surface 21 is connected to the port rear portion 23, the left port side 25 and the right port side 27.

In one embodiment, the sound guiding surface 21, the port portion 23, or both may be fabricated from or may have layered upon a layer of sound reflecting material different from a material from which the rest of the protective case 1 is fabricated. For example, the sound guiding surface 21, the port portion 23, or both may be fabricated from or may have layered on a layer of plastic harder than a plastic from which the rest of the protective case is fabricated. In another example, the sound guiding surface 21, the port portion 23, or both may be fabricated from or may have layered on a layer of marble, granite, ceramic material, metal (e.g., steel), glass, etc., materials that would tend to reflect sound rather than absorb it.

The shell 3 may include a protective membrane (not shown) located to correspond to the location of a screen of the mobile electronic device. The protective membrane may allow viewing of the screen or at least some of the screen of the device and may allow for the use of touchscreen features of the device's screen. The shell 3 may also include a protective membrane (not shown) which is located to correspond to a camera lens of the mobile electronic device. Such membranes may be moisture and/or dust resistant such that they allow for viewing through the membranes while protecting the electronic mobile device against moisture and/or dust.

Although the illustrated protective case 1 corresponds to a specific illustrated mobile electronic device, it should be understood that the features of the disclosed invention are available for other mobile electronic devices.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (3D. Ed. 1995).

What is claimed is:

1. A protective case for a mobile electronic device, the case comprising:

a shell defining a cavity for receiving a portion of the mobile electronic device within the cavity, the shell including:

a rear panel disposed generally on a plane;

a left case side extending substantially perpendicular to the plane and a right case side extending substantially perpendicular to the plane opposite the left case side;

a case top side extending substantially perpendicular to the plane adjacent top portions of the left case side and the right case side;

a case bottom side disposed opposite the case top side adjacent bottom portions of the left case side and the right case side, the case bottom side including: a left device retaining portion adjacent the bottom portion of the left case side and a right device retaining portion adjacent the bottom portion of the right case side; and a left sound port including a left sound guiding surface that inclines relative to the plane as the left sound guiding surface extends away from the case bottom side and the left device retaining portion and a right sound port including a right sound guiding surface that inclines relative to the plane as the right sound guiding surface extends away from the case bottom side and the right device retaining portion, wherein the left sound port and the right sound port extend further away from the case bottom side and the right and left retaining portions than any portion of the protective case disposed therebetween, wherein the left sound guiding surface and the right sound guiding surface are each disposed remote from the cavity and the case bottom side, the left sound port includes a left port rear portion extending on the plane or parallel to the plane away from the left device retaining portion and the case bottom side, the left sound guiding surface disposed at an extreme end of the left sound port away from the case bottom side with the left port rear portion disposed between the left sound guiding surface and the case bottom side, the right sound port includes a right port rear portion extending on the plane or parallel to the plane away from the right device retaining portion and the case bottom side, the right sound guiding surface disposed at an extreme end of the right sound port away from the case bottom side with the right port rear portion disposed between the right sound guiding surface and the case bottom side.

2. The protective case of claim 1, wherein the guiding surfaces incline from 5 to 85 degrees relative to the plane.

3. The protective case of claim 1, wherein the sound guiding surfaces incline 45 degrees relative to the plane.

4. The protective case of claim 1, wherein the left sound guiding surface inclines at a first angle relative to the plane and the right sound guiding surface inclines at a second angle relative to the plane different from the first angle.

5. The protective case of claim 1, wherein each of the two sounds ports includes a left port side extending substantially perpendicular to the respective port rear portion and a right port side b extending substantially perpendicular to the respective port rear portion.

6. The protective device of claim 1, including a data port configured to let through a connector at least partially shrouded by a header, the data port disposed between the two sound ports.

7. A protective case for a mobile electronic device, the case comprising:
a rear panel disposed generally on a plane;
a left case side extending from the rear panel away from the plane and a right case side extending from the rear panel away from the plane and opposite the left case side;
a case top side extending from the rear panel away from the plane between top portions of the left case side and the right case side;
a case bottom side disposed between bottom portions of the left case side and the right case side, the case bottom side including: left and right corner portions adjacent the bottom portion of the left case side and the bottom portion of the right case side, respectively; and
a first sound port including a first sound guiding surface wherein a rear portion of the first sound guiding surface adjacent the plane is closer to the left and right corner portions than a front portion of the first sound guiding surface disposed away from the plane and a second sound port including a second sound guiding surface wherein a rear portion of the second sound guiding surface adjacent the plane is closer to the left and right corner portions than a front portion of the first sound guiding surface disposed away from the plane, wherein the first sound port and the second sound port extend further away from the case bottom side and the right and left corner portions than any portion of the protective case disposed therebetween, wherein the first sound guiding surface and the second sound guiding surface are each disposed remote from the case bottom side, the first sound port includes a first port rear portion extending on the plane or parallel to the plane away from the left corner portion and the case bottom side, the first sound guiding surface disposed at an extreme end of the first sound port away from the case bottom side with the first port rear portion disposed between the first sound guiding surface and the case bottom side, the second sound port includes a second port rear portion extending on the plane or parallel to the plane away from the second corner portion and the case bottom side, the second sound guiding surface disposed at an extreme end of the second sound port away from the case bottom side with the second port rear portion disposed between the second sound guiding surface and the case bottom side.

8. The protective case of claim 7, wherein straight lines between the rear portions of the sound guiding surfaces and the front portions of the sound guiding surfaces incline from 5 to 85 degrees relative to the plane.

9. The protective case of claim 7, wherein straight lines between the rear portions of the sound guiding surfaces and the front portions of the sound guiding surfaces incline 45 degrees relative to the plane.

10. The protective case of claim 7, wherein the first guiding surface inclines at a first angle relative to the plane and the second guiding surface inclines at a second angle relative to the plane different from the first angle.

11. The protective case of claim 7, wherein each of the two sounds ports includes a left port side extending substantially perpendicular to the respective port rear portion and a right port side extending b substantially perpendicular to the respective port rear portion.

12. The protective device of claim 7, including a data port configured to let through a connector, the data port disposed between the two sound ports.

13. A protective case for a mobile electronic device, the case comprising:
a rear panel disposed generally on a plane;
a left case side extending from the rear panel away from the plane and a right case side extending from the rear panel away from the plane and opposite the left case side;
a first case top/bottom side disposed between top portions of the left case side and the right case side; and
a second case top/bottom side disposed between bottom portions of the left case side and the right case side,
at least one of the first and second case top/bottom sides including a sound port including a sound guiding surface wherein a rear portion of the sound guiding surface adjacent the plane is closer to the left case side and the right case side than a front portion of the sound guiding surface disposed away from the plane, wherein the sound port extends further away from the left case side and the right case side than any other not sound port portions of the protective case, wherein the sound guiding surface is disposed remote from the at least one of the first and second case top/bottom sides, the sound port includes a port rear portion extending on the plane or parallel to the plane away from the at least one of the first and second case top/bottom sides, the sound guiding surface disposed at an extreme end of the sound port away from the at least one of the first and second case top/bottom sides with the port rear portion disposed between the sound guiding surface and the at least one of the first and second case top/bottom sides.

14. The protective case of claim 13, wherein the sound guiding surface is fabricated from or has layered thereupon a layer of marble, granite, ceramic material, metal, or glass.

15. The protective case of claim 13, including first and second sound ports that extend further away from the plane and the right and left case side than any portion of the protective case disposed therebetween.

* * * * *